United States Patent [19]

Niemela

[11] Patent Number: 5,203,071
[45] Date of Patent: Apr. 20, 1993

[54] METHOD OF MOTOR CONSTRUCTION

[75] Inventor: Paul W. Niemela, Pickens, S.C.

[73] Assignee: Ryobi Motor Products Corp., Easley, S.C.

[21] Appl. No.: 765,249

[22] Filed: Sep. 25, 1991

Related U.S. Application Data

[62] Division of Ser. No. 608,805, Nov. 5, 1990, Pat. No. 5,160,867.

[51] Int. Cl.5 .......................................... H02K 15/14
[52] U.S. Cl. ......................................... 29/596; 29/463
[58] Field of Search ............... 29/596, 463; 310/42, 310/89, 46, 154

[56] References Cited

U.S. PATENT DOCUMENTS

| | | |
|---|---|---|
| 1,428,195 | 9/1922 | Wahl et al. ............................. 29/463 |
| 2,804,559 | 8/1957 | Brewer ............................ 29/463 X |
| 3,419,957 | 1/1969 | Stone ..................................... 29/596 |
| 3,555,320 | 1/1971 | Johnson . |
| 3,873,864 | 3/1975 | Apostoleris . |
| 4,118,644 | 10/1978 | Schulte et al. . |
| 4,164,673 | 8/1979 | Mazzorana . |
| 4,309,815 | 1/1982 | Schmitt et al. . |
| 4,372,035 | 2/1983 | McMillen . |
| 4,501,983 | 2/1985 | Schmider . |
| 4,520,284 | 5/1985 | Wolcott . |
| 4,528,473 | 7/1985 | Tezuka . |
| 4,529,902 | 7/1985 | Lordo . |
| 4,581,555 | 4/1986 | Kuznetsov et al. . |
| 4,668,887 | 5/1987 | D'Argouges et al. . |
| 4,707,630 | 11/1987 | Tomite et al. . |
| 4,795,932 | 1/1989 | Long . |
| 4,845,398 | 7/1989 | DeCesare . |
| 4,939,400 | 7/1990 | Matsushita et al. . |
| 5,047,679 | 9/1991 | Baader et al. . |

Primary Examiner—Joseph M. Gorski
Attorney, Agent, or Firm—Brooks & Kushman

[57] ABSTRACT

A motor field assembly and method for constructing a permanent magnet motor wherein the shell is formed of relatively thick flat sheet stock as two rectangular portions and an elongated connecting portion. The rectangular portions are rolled into semi-cylindrical shapes and the connecting portion is bent at two places so that the two rectangular portions are in opposed parallel relationship to form a unitary cylindrical motor housing shell with a pair of diametrically opposed seams, the connecting portion forming an end wall of the motor housing. Annular permanent magnet segments are provided and mounted to the interior of the shell in spaced equiangular relation with a central portion of each segment of a pair of diametrically opposed segments spanning a respective seam.

9 Claims, 3 Drawing Sheets

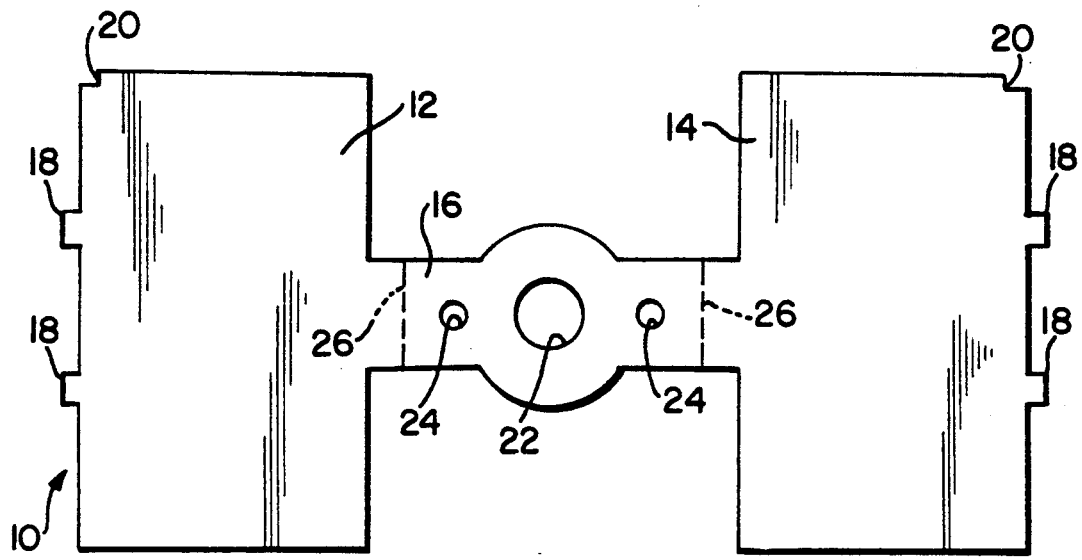
F I G. 1
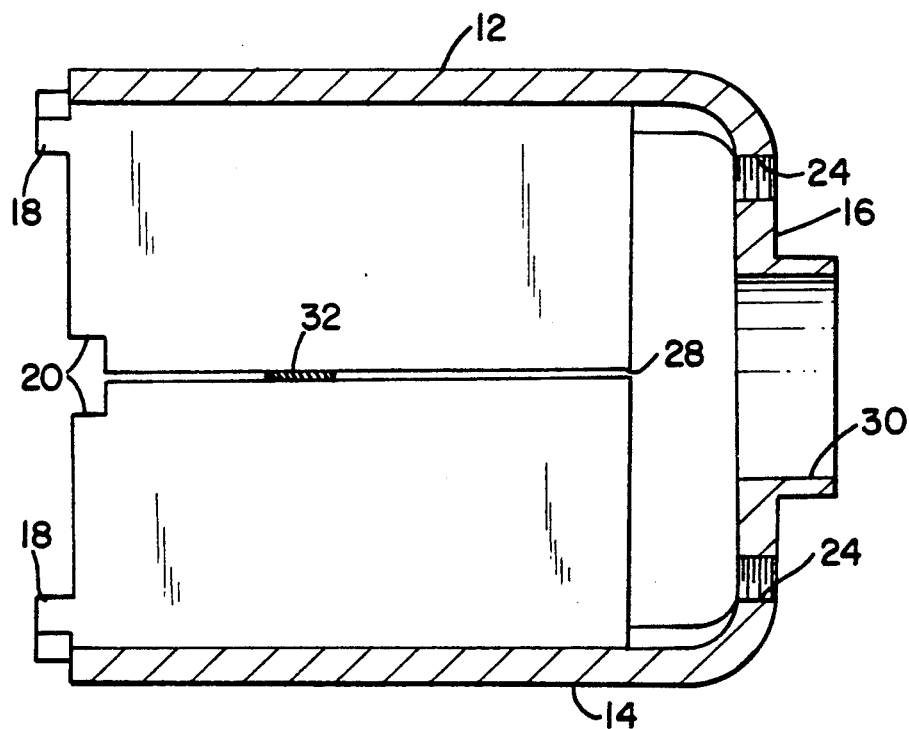
F I G. 2

METHOD OF MOTOR CONSTRUCTION

This application is a division of application Ser. No. 07/608,805, filed Nov. 5, 1990, and now U.S. Pat. No. 5,160,867.

BACKGROUND OF THE INVENTION

This invention relates to permanent magnet motors and, more particularly, to a method of constructing such a motor and a motor field assembly constructed by such method.

In the past, it was common to form a motor shell for a permanent magnet motor by deep drawing relatively thin sheet stock into a cup-shaped configuration. With the advent of higher strength magnets, this thin sheet stock material has been found to have insufficient flux carrying capability. However, thicker sheet stock material cannot be deep drawn. U.S. Pat. No. 4,309,815 to Schmitt et al discloses a motor housing for a small motor wherein the cylindrical wall must be of a certain thickness. This wall is formed by providing a sheet metal band which is bent on a mandrel, on top of which is bent a sheet metal strip, so that the combined thickness of the band and the strip satisfies the wall thickness requirement. This construction is disadvantageous in that it requires two pieces of material for forming the motor shell, both of which require a forming operation. It would still be desirable, however, to manufacture the motor shell out of sheet stock, for reasons of economy. Accordingly, it is an object of this invention to provide a method of motor construction which utilizes sheet stock material of sufficient thickness for carrying the flux of high strength magnets.

SUMMARY OF THE INVENTION

The foregoing, and additional, objects are attained in accordance with the principles of this invention by forming a motor shell blank from sheet stock, the motor shell blank including two equal size rectangular portions joined by an elongated connecting portion. The rectangular portions are then rolled about an axis parallel to the connecting portion to form a semi-cylindrical configuration from each of the rectangular portions, and the connecting portion is thereafter bent at two places so that the two rectangular portions are in opposed parallel relationship so that together they form a cylindrical motor housing shell with two diametrically opposed seams, with the connecting portion forming a motor housing end wall.

In accordance with an aspect of this invention, an even number of annular permanent magnet segments are provided and mounted to the interior of the shell with a central portion of each segment of a pair of diametrically opposed segments spanning a respective seam.

In accordance with another aspect of this invention, the connecting portion is formed with a central circular aperture and the region around the aperture is worked to form a cylindrical bearing support for the motor armature bearing.

In accordance with a further aspect of this invention, a motor field assembly for a permanent magnet motor comprises a unitary housing shell including a pair of semi-cylindrical portions positioned in opposition to form a cylindrical shell with two diametrically opposed seams, and a connecting portion joining the pair of semi-cylindrical portions forms a motor housing end wall.

BRIEF DESCRIPTION OF THE DRAWINGS

The foregoing will be more readily apparent upon reading the following description in conjunction with the drawings in which like elements in different figures thereof have the same reference numeral and wherein:

FIG. 1 is a plan view of a sheet stock blank for forming a motor shell according to this invention;

FIG. 2 is a cross-sectional view of the inventive motor shell formed from the blank of FIG. 1;

DETAILED DESCRIPTION

Figure 3:
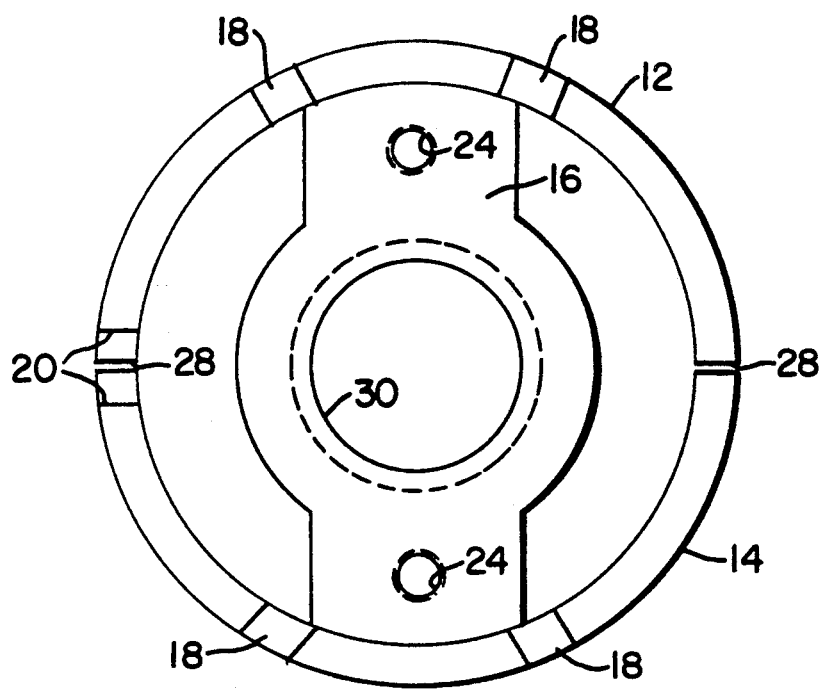
FIG. 3 is an end view of the shell of FIG. 2.

Referring now to the drawings, FIG. 1 illustrates a blank 10 which is formed from a flat sheet of magnetoconductive material. Illustratively, the sheet material is 0.125 inch thick low carbon steel. The blank 10 may be formed in any conventional manner, such as by stamping, and is formed to have two substantially equal size rectangular portions 12, 14 which are joined by an elongated connecting portion 16. Each of the rectangular portions 12, 14 is formed with a pair of tabs 18 and a notch 20. The purpose of the tabs 18 and the notch 20 will become apparent from the following description. The connecting portion 16 is formed with a central circular aperture 22 and the region surrounding the aperture 22 is enlarged and generally circular in plan configuration. A pair of internally threaded openings 24 are formed in the connecting portion 16 flanking the aperture 22.

After the blank 10 is formed as in FIG. 1, the rectangular portions 12 and 14 are rolled about an axis parallel to the connecting portion 16 so that each of the rectangular portions 12 and 14 is formed into a semi-cylindrical configuration. The connecting portion 16 is then bent at two places, as illustrated by the broken lines 26 in FIG. 1, so that the two rectangular portions 12, 14, now each semi-cylindrical in shape, are in opposed parallel relationship, as shown in FIGS. 2 and 3. The portions 12 and 14 thus together form a cylindrical motor housing shell with two diametrically opposed seams 28, with the connecting portion 16 forming an end wall for the motor housing. The region of the connecting portion 16 surrounding the aperture 22 is drawn out away from the shell formed by the portions 12, 14, as shown in FIG. 2, so as to form a cylindrical bearing support 30. The seams 28 may be spot welded, as at 32 (FIG. 2), to insure that the shell structure retains its shape during the motor assembly.

Figure 5:
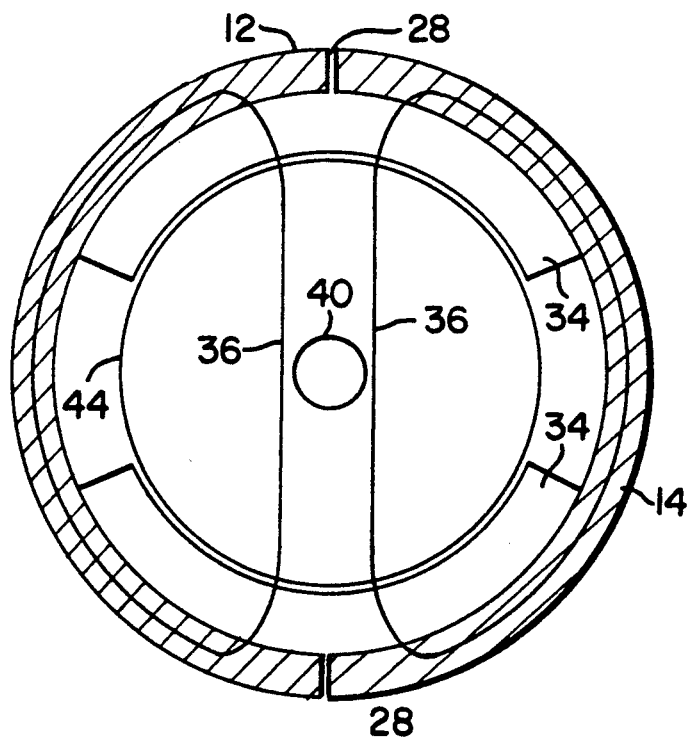
FIG. 5 is a cross-sectional view taken along the line 5—5 in FIG. 4 illustrating the mounting of the field magnet segments in the shell and illustrating the flux paths through the shell.
Figure 4:
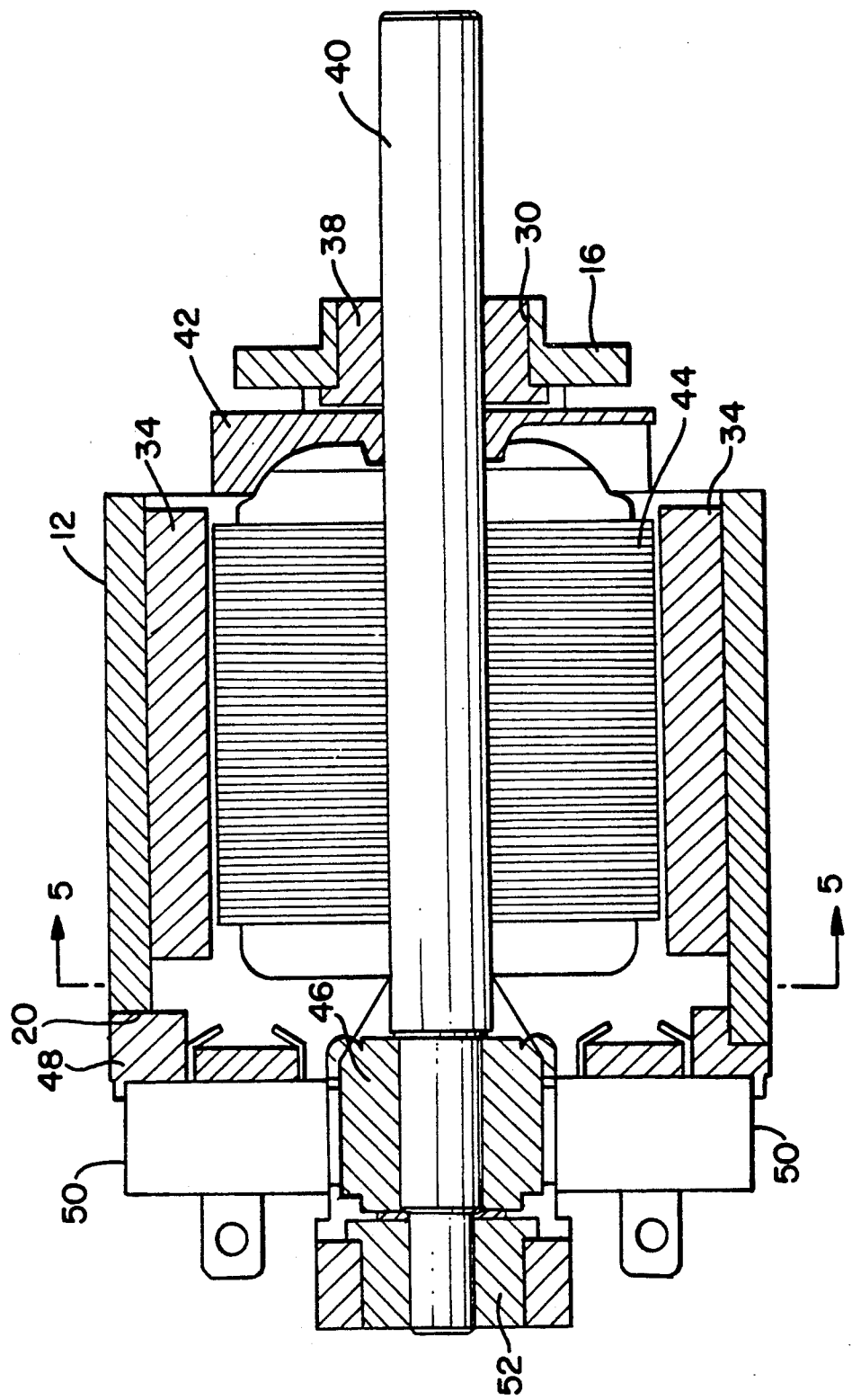
FIG. 4 is a cross-sectional view of a motor assembly according to this invention utilizing the shell of FIG. 2 taken through the opposed seams.

According to this invention, for a two pole motor, a pair of annular permanent field magnet segments 34 are provided. Each of the segments 34 subtends an arc greater than 90° and less than 180°. The segments 34 are mounted to the interior of the motor shell, specifically to the inner surfaces of the portions 12, 14, such as by adhesive or the like, with a central portion of each of the magnet segments 34 spanning a respective seam 28, as best shown in FIG. 5. FIG. 5 also illustrates the flux paths 36 of the magnets 34 and shows how the seams 28 are in a neutral part of the flux paths 36 so as not to form any gap therein. For a motor having more than two poles, each field magnet segment subtends an arc less than 360°/N, where N is the number of poles and is an even number, the segments are equiangularly spaced about the motor shell, and a central portion of each segment of a pair of diametrically opposed segments spans a respective seam 28. This completes the motor field assembly.

To complete the assembly of the motor, a shaft bearing 38 is press fit into the bearing support 30. A motor armature assembly is provided. This assembly includes an armature shaft 40, on which is mounted a fan 42, an armature winding 44, and a commutator 46. The end of the shaft 40 opposite the commutator 46 is inserted through the bearing 38 so that the shaft 40 is journalled for rotation therein. An end wall 48 is then fastened to the open end of the motor shell. The end wall 48 is suitably formed with a locating projection which fits in the notches 20 and with suitable openings through which the tabs 18 may extend. The tabs 18 are then crimped over the end wall 48 to secure the end wall 48 to the motor shell. The end wall 48 has a pair of motor brush assemblies 50 supported thereon and positioned to cooperate with the commutator 46 in a conventional manner. The end wall 48 further is formed to support a bearing 52 in which the commutator end of the shaft 40 is journalled for rotation.

Accordingly, there has been disclosed an improved method of constructing a permanent magnet motor. While a preferred embodiment of the present invention has been disclosed herein, it is understood that various modifications and adaptations to the disclosed method will be apparent to those of ordinary skill in the art and it is only intended that this invention be limited by the scope of the appended claims.

I claim:

1. A method for constructing an electric motor including a motor armature assembly, the method comprising the steps of:
   providing a motor armature assembly;
   providing a flat sheet of magneto-conductive material;
   forming from said sheet a blank having two equal size rectangular portions joined by an elongated connecting portion;
   rolling said rectangular portions about an axis parallel to said connecting portion, thereby forming each of said rectangular portions into a semi-cylindrical configuration;
   bending said connecting portion at two places so that said two rectangular portions are in opposed parallel relationship, thereby forming a cylindrical motor housing shell which encloses the motor armature assembly, the housing shell having two diametrically opposed seams, said connecting portion forming a motor housing end wall;
   providing N annular permanent magnet segments, where N is an even number equal to the number of poles of the motor, each of said segments subtending an arc less than 360°/N; and
   mounting said segments to the interior of said shell in spaced equiangular relation with a central portion of each segment of a pair of diametrically opposed segments spanning a respective seam.

2. The method according to claim 1 wherein the step of providing N annular permanent magnet segments includes the step of providing two annular permanent magnet segments, each of said segments subtending an arc greater than 90° and less than 180°.

3. The method according to claim 1 wherein said forming step comprises the steps of:
   forming said connecting portion with a central circular aperture; and
   drawing out a region of said connecting portion surrounding said aperture away from said shell, thereby forming a cylindrical bearing support.

4. The method according to claim 3 further comprising the steps of:
   inserting a first shaft bearing in said cylindrical bearing support;
   inserting the motor armature assembly inside said shell with an end of the armature shaft journalled for rotation in said first shaft bearing; and
   fastening an end wall supporting a second shaft bearing to the end of said shell opposite said connecting portion, thereby journalling the other end of the armature shaft for rotation in said second shaft bearing.

5. The method according to claim 4 further comprising the step of supporting a pair of motor brush assemblies on said end wall.

6. The method according to claim 1 further comprising the step of spot welding said seams.

7. A method for constructing an electric motor comprising the steps of:
   forming a blank having two rectangular portions joined by an elongated connecting portion;
   rolling said rectangular portions about an axis parallel to said connecting portion, thereby forming each of said rectangular portions into a semi-cylindrical configuration;
   bending said connecting portion so that said rectangular portions are in opposed parallel relationship, thereby forming a cylindrical motor housing shell having two diametrically opposed seams;
   providing N annular permanent magnet segments, where N is an even number equal to the number of poles of the motor, each of said segments subtending an arc less than 360°/N;
   mounting said segments to the interior of said shell with a central portion of each segment of a pair of diametrically opposed segments spanning a respective seam; and
   inserting a motor armature assembly inside the housing shell.

8. The method of claim 7 wherein the step of forming a unitary motor housing shell comprises the steps of:
   forming said connecting portion with a central circular aperture; and
   drawing out a region of said connecting portion surrounding said aperture away from said shell, thereby forming a cylindrical bearing support.

9. The method of claim 8 further comprising the steps of:
   inserting a first shaft bearing in said cylindrical bearing support, the armature assembly having an armature shaft journalled for rotation in said first shaft bearing; and
   fastening an end wall supporting a second shaft bearing to the end of said shell opposite said connecting portion, thereby journalling the other end of the armature shaft for rotation in said second shaft bearing.

* * * * *